(12) United States Patent
Sandström et al.

(10) Patent No.: US 8,866,603 B2
(45) Date of Patent: Oct. 21, 2014

(54) METHOD FOR COMMUNICATING A DEVIATION OF A VEHICLE PARAMETER

(75) Inventors: Joel Sandström, Göteborg (SE); Emma Rozada, Göteborg (SE)

(73) Assignee: Volvo Technology Corporation, Göteborg (SE)

( * ) Notice: Subject to any disclaimer, the term of this patent is extended or adjusted under 35 U.S.C. 154(b) by 856 days.

(21) Appl. No.: 12/678,490

(22) PCT Filed: Sep. 17, 2007

(86) PCT No.: PCT/SE2007/000814
§ 371 (c)(1),
(2), (4) Date: Apr. 26, 2010

(87) PCT Pub. No.: WO2009/038502
PCT Pub. Date: Mar. 26, 2009

(65) Prior Publication Data
US 2010/0231372 A1    Sep. 16, 2010

(51) Int. Cl.
| | | |
|---|---|---|
| *B60Q 1/00* | (2006.01) | |
| *G01P 1/08* | (2006.01) | |
| *B60K 35/00* | (2006.01) | |
| *G01D 7/00* | (2006.01) | |
| *G01D 7/02* | (2006.01) | |

(52) U.S. Cl.
CPC . *G01P 1/08* (2013.01); *B60K 35/00* (2013.01); *G01D 7/005* (2013.01); *G01D 7/02* (2013.01); *B60K 2350/1064* (2013.01); *B60K 2350/2008* (2013.01); *B60K 2350/962* (2013.01); *B60K 2350/965* (2013.01)
USPC .............................. 340/438; 340/459; 180/170

(58) Field of Classification Search
CPC .............................. B60K 31/18; B60K 31/185
USPC .......... 340/459, 438, 905, 441, 936; 701/117, 701/119; 180/170
See application file for complete search history.

(56) References Cited

U.S. PATENT DOCUMENTS 5,457,439 A    10/1995    Kuhn
(Continued)

FOREIGN PATENT DOCUMENTS

| DE | 19940718 C1 | 5/2001 | |
|---|---|---|---|
| EP | 0790592 | * 8/1997 | ............. G08G 1/096 |
| EP | 0790592 A1 | 8/1997 | |
| EP | 1215072 A1 | 6/2002 | |
| EP | 1785326 A1 | 5/2007 | |

OTHER PUBLICATIONS

International Search Report for corresponding International Application PCT/SE2007/000814.

(Continued)

*Primary Examiner* — Steven Lim
*Assistant Examiner* — Hongmin Fan
(74) *Attorney, Agent, or Firm* — WRB-IP LLP

(57) ABSTRACT

A method, a device and a system for communicating in a vehicle at least one deviation of a measured actual vehicle parameter value from its predetermined value to a driver involve determining an amount of the deviation, color-coding the amount of deviation, and communicating the amount of deviation to the driver by using the color-code. Determining the amount of deviation includes weighting a calculated difference between the measured actual vehicle parameter value and the predetermined vehicle parameter value with a weighting factor. A vehicle or more particularly a truck may include such a device and such a system and a computer programmed for performing such a method and computer readable medium comprising a program for performing such a method can be provided.

19 Claims, 3 Drawing Sheets

(56) References Cited

U.S. PATENT DOCUMENTS

| | | |
|---|---|---|
| 5,485,381 A | 1/1996 | Heintz et al. |
| 5,815,072 A * | 9/1998 | Yamanaka et al. ............ 340/461 |
| 7,634,341 B2 * | 12/2009 | Patchell .......................... 701/45 |
| 2005/0083187 A1 | 4/2005 | Briman et al. |
| 2005/0251335 A1 | 11/2005 | Ibrahim |
| 2006/0028330 A1 * | 2/2006 | Gallant et al. ................ 340/441 |
| 2007/0001830 A1 * | 1/2007 | Dagci et al. ................... 340/438 |
| 2007/0050127 A1 | 3/2007 | Kellum et al. |
| 2007/0150157 A1 * | 6/2007 | Lee et al. ........................ 701/93 |

OTHER PUBLICATIONS

International Preliminary Report on Patentability for corresponding International Application PCT/SE2007/000814.

Supplementary European Search Report (Oct. 2, 2013) for corresponding European Application EP 07 83 5046.

* cited by examiner

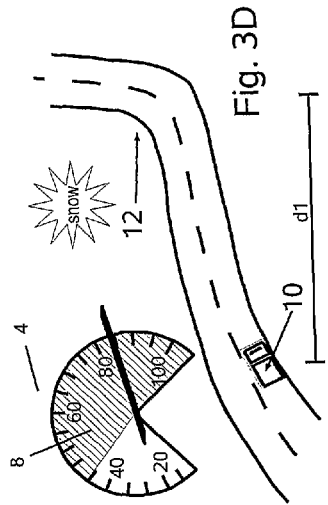
Fig. 3A
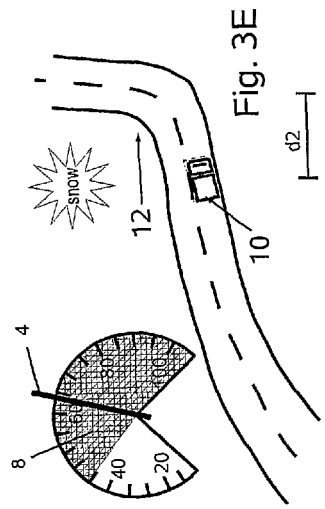
Fig. 3B
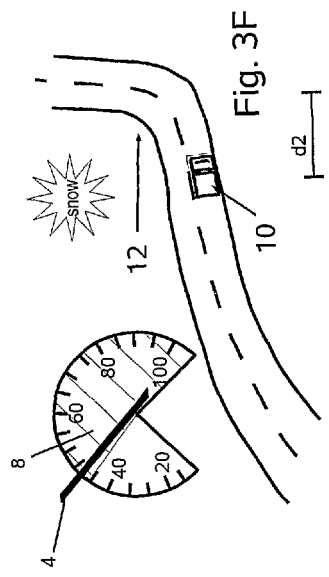
Fig. 3C
Fig. 3D
Fig. 3E
Fig. 3F

METHOD FOR COMMUNICATING A DEVIATION OF A VEHICLE PARAMETER

BACKGROUND AND SUMMARY

The present invention relates to a method, a device and a system in a vehicle for communicating a deviation of a measured actual vehicle parameter value from its corresponding predetermined value to a driver as well as a vehicle comprising such a device and such a system, and a computer readable medium comprising a computer program for performing such a method.

Modern vehicles comprise a plurality of devices and systems for communicating different values or warnings to a driver. Especially, the application of different driver assistance systems, as e.g. an ADAS system (advanced driver assistance system) are intended to assist the driver by providing a plurality of additional information, the driver is often not even able to be aware of. For example, the ADAS system provides data of a travelled road, e.g. whether the vehicle is approaching a curve or bend, or what kind of road is travelled (highway etc.). Even additional information on the road pavement can be communicated to the driver. Often the vehicle is also equipped with infra-red cameras and/or wireless communication possibilities gathering information provided on the road for example by sign posts or by remote navigation system providers. Also other environmental conditions, such as rain, wind, darkness, can be taken into account and be communicated to the driver. But also "simple" information, as for example the fact that a driver is exceeding a speed limit, can be communicated. Mostly, this information is communicated by warnings in order to attract the driver's attention.

From the article of Kumar, M., Kim, T., "Dynamic Speedometer: Dashboard redesign to discourage drivers from speeding", CHI, Apr. 2-7, 2005, Portland, Oreg., USA (see also: hci.stanford.edu/research/speedometer/LBR-197-kumar.pdf), for example a speedometer is known which is adapted to visually distinguish the regions of the speedometer which are higher than a current speed limit. As the speed limit changes, the visualization on the display is updated accordingly. This relieves the driver of the task of waiting/searching for speed limit signs on the road to determine the current speed limit in effect. The disclosed speedometer can be instrumented to provide visual cues such as making the speedometer needle glow, changing the colour/illumination of the over-the-speed limit region of the speedometer, or changing the background of the dial itself when the driver exceeds a certain threshold over the speed limit. Additionally, an audio notification such as beeps of varying frequency and amplitude can be used, wherein the variation can be dependent on the excess over the speed.

The additional information provided to the driver is supposed to increase the safety of driver, passenger(s) and outside traffic participants, since knowing the vehicle's current situation may allow the driver/vehicle to prevent accidents. On the other hand the plurality of information and warnings can easily distract the driver's attention or even result in a complete neglect.

It is therefore desirable to provide a communication method, device and system which communicate information about vehicle related parameters to the driver of said vehicle and support the driver in driving said vehicle without the need of direct interaction.

According to aspects of the present invention, a communication method, a device and a system, as well as a vehicle and a computer and computer program product are provided.

An aspect of the invention is based on the idea that by (i) determining an amount of a deviation of an measured actual vehicle parameter value from its corresponding predetermined value, (ii) colour-coding said determined amount of deviation and (iii) communicating said amount of deviation to the driver by using said color code, the driver can be guided to the correct drive behaviour without direct warning.

For determining the amount of deviation, according to the invention it is preferred to use an algorithm which is based on a weighting function and which combines the difference between the measured actual value of the vehicle parameter and its corresponding predetermined value with a first weighting factor. The weighting factor is related to the vehicle parameter and can advantageously be at least one of (i) an additional vehicle parameter, e.g. weight, payload, braking power, and/or (ii) an environmental parameter, such as road conditions/characteristics, weather, distance to an obstacle etc. The result is color coded communicated to the driver and also gives an information about a necessity to act.

The predetermined value itself can be, as a preferred embodiment of the invention shows, a target value the measured actual vehicle parameter should have at a predetermined target time and/or a predetermined target location, and can also be weighted with a second weighting factor. Since the second weighting factor is also related to at least one additional vehicle parameter e.g. weight, payload, braking power, and/or at least one environmental parameter, such as road conditions/characteristics, weather, distance to an obstacle etc. the target value changes correspondingly.

According to another preferred embodiment, the predetermined target value is a calculated optimal value for the measured actual vehicle parameter at the time and/or the location of the actual measurement. The optimal value can be determined e.g. by a nominal function, such as an interpolation or an extrapolation between/from the measured actual vehicle parameter measured at an initial time and/or an initial location and/to a target value the measured vehicle parameter should have at a target time and/or a target location. The calculation of the optimal value can also take into account a second weighting factor which in turn is related to another vehicle parameter e.g. weight, payload, braking power, and/or an environmental parameter, such as road conditions/characteristics, weather, distance to an obstacle etc.

Consequently, the color coded information of the deviation of the measured actual vehicle parameter value and the optimal value can guide the driver to the correct driving behaviour.

In other words, if the actual measured value is the optimal value for the location the value is measured, the method according to the invention will not show any color coded information at all. Only, if the actual measured value of the vehicle parameter deviates from the calculated optimal value for the corresponding measurement location, the method according to the invention will show any colour-coded information to the driver.

Since, as explained above, this difference between the actual measured vehicle parameter value and the predetermined vehicle parameter value is a continuous function in time which usually will increase or decrease having positive values (in case the measured actual vehicle parameter value exceeds its predetermined value) or negative values (in case the measured actual vehicle parameter value is below its predetermined value) or zero (in case the measured actual vehicle parameter value is identical with its predetermined value) the corresponding color code will change continuously as well.

Preferably, the color code is communicated to the driver's peripheral vision so that the driver is not distracted from driving the vehicle by paying attention to a plurality of warnings. Especially, the communicated information can also be a combination of a plurality of system parameters without increasing the number of warnings.

The communication to the driver's peripheral vision can be achieved for instance by changing the color brightness, color saturation and/or color hue of a communication device, so that the communication device is more or less visible to the driver whereby also a necessity to react is communicated.

This continuous change causes fading in/fading out effects of the color coded information signal shown to the driver on the communication device. If he currently does not drive the vehicle in accordance with the correct way (i.e. the correct vehicle speed as a function of time) the warning signal according to the invention will be shown causing him to react. If he, as a preferred embodiment of the invention shows, decelerates or accelerates the vehicle, as the case may be, towards the optimal speed or the target speed the color coded signal will gradually fade out (change in brightness towards lower brightness values) or change its color hue e.g. towards green, thereby indicating that the driver is moving towards the correct driving behaviour. If he, contrary to such behaviour, is accelerating or decelerating the vehicle, as the case may be, away from the optimal speed or the target speed the color coded signal will gradually-fade in -(change in brightness towards higher brightness values) or change its color hue e.g. towards red. If and as long as the actual current vehicle parameter is either above or below the optimal speed or target speed it may under special circumstances happen that the color coded signal will not change at all depending on the weighting factors used. Since the first and/or second weighting factor/s is/are dependent on at least one additional vehicle parameter e.g. weight, payload, braking power, and/or at least one environmental parameter, such as road conditions/characteristics, weather, distance to an obstacle etc., the color coded signal usually is different for different vehicles and/or different times and/or different situations.

It is also possible to use the invention for other vehicle parameters, as e.g. RPM (Revolutions Per Minute) or fuel consumption. Preferably, the vehicle parameter is related to parameters provided by a driver's assistance system, as for example an ADAS system, and/or by a remote system e.g. a customer defining the driving behaviour of his drivers, for example a recommendation for travelling along with a green wave.

The invention can advantageously be used for vehicle parameters which are suitable for being communicated by a gauge or a meter to the driver. The color coded can preferably be implemented by changing the illumination, e.g. the background light of the gauge/meter or by colouring the gauge's/meter's display. The illumination/colouring can be performed for example by the use of LED, or the speedometer itself is already designed as LCD panel.

Preferably, the color coded is provided by increasing/decreasing the brightness or hue of a color of e.g. of the gauge's/meter's background light. Dependent on the weighted amount of deviation and whether or not that weighted amount is increasing or decreasing over the time the background light is fading in (i.e. gradually increasing its brightness, hue, or intensity or gradually changing its color for instance in a range from green over yellow to red or, alternatively, from normal display background light (or to a state without any background light-)-over yellow-to-red) or fading out (i.e. gradually decreasing its brightness, hue, or intensity or gradually changing its color for instance in a range from red over yellow to green or, alternatively, from red over yellow to the normal background light (or to a state without any background light)) and is therefore recognizable by the driver's peripheral vision. It is therefore not recognized as "real" warning, and consequently the driver is not distracted by it. Because of the smooth fading in/fading out it is also possible to communicate the "warning" quite late without causing panic reactions by the driver. It also provides an easy retrofitting possibility for existing vehicles.

According to a further preferred embodiment of the invention color hue, brightness and/or saturation are/is also adaptable to ambient light. This has the advantage that a deterioration of the visibility due to daylight or other bright ambient light or distracting reflections of the inventive communication device in a windscreen during night-time or driving in a tunnel can be reduced. Especially, since the peripheral vision of the driver is addressed, reduced visibility or distraction by reflections can result in a disregard of the information. Preferably, the adaptation can be performed manually or automatically. The actual ambient light can preferably be measured with the help of optical sensors.

According to another preferred embodiment, only a part of the gauge/meter is illuminated/coloured, particularly that part which exceeds/succeeds the predetermined value. That means for example for the above described embodiment of the bend speed warning that that part of the speedometer is coloured that is between the predetermined speed for the bend and the measured actual speed shown at the speedometer (exceeding the predetermined speed). The weighted amount of the deviation from the measured actual value and the predetermined value can then again be communicated by fading of the color brightness, saturation or hue. It is also possible to increase/decrease the illuminated/coloured part of the gauge/meter to indicate the amount of deviation.

Further advantages and preferred embodiments are defined by the description and/or the figures.

BRIEF DESCRIPTION OF THE DRAWINGS

In the following the invention is described in more detail by means of preferred embodiments. The described preferred embodiments are exemplary only and should not be used to restrict the invention thereto.

The figures show:

FIGS. 3A-3F: different scenarios of a preferred embodiment of the inventive method.

DETAILED DESCRIPTION

Figure 1A:
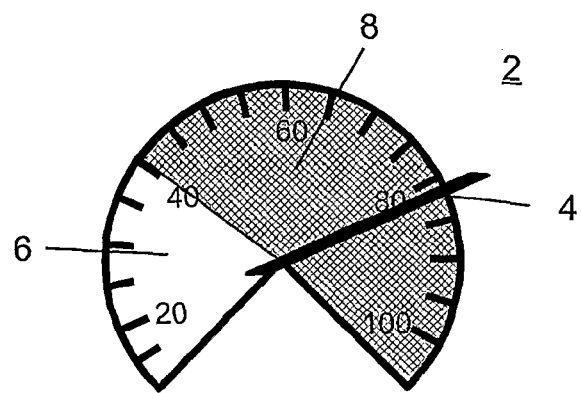
FIGS. 1A-1D: a first embodiment of the inventive device.

In the following the invention is described for a preferred embodiment, wherein the vehicle parameter is the vehicle's speed which is communicated to a driver by means of a speedometer. For explaining the invention's advantages, a situation is discussed wherein a vehicle is approaching a bend on the road, and the measured actual speed value of the vehicle is higher than a predetermined speed value which would condition the vehicle for being able to drive through the bend ahead in the wanted (safe) way. The predetermined speed value of the vehicle is determined for instance by a driver assistance system, particularly an ADAS system. But it can also be determined by a remote system for example an on-line navigation system or a remote road driving guidance system.

In principle there are two possibilities to define the predetermined vehicle parameter value:

1. One approach is that a driver assistance system, such as an ADAS system, calculates a target speed with which the vehicle can drive safely through a bend ahead. This target speed—can change dependent on other vehicle parameters-e.g. payload and/or environmental parameters such as weather conditions (smart ADAS). In this case the target speed can also be monitored and changed in order to avoid accidents caused by fast changing road conditions e.g. freezing rain. But it is also possible that the target speed is a constant once stored in a database of the driver assistance system (simple ADAS). This target speed is then taken as predetermined speed.

The difference between the measured actual speed value and the target speed value is constantly re-calculated and the result is weighted by a weighting factor. The weighting factor weights the difference between the measured actual speed and the target speed and is, in this case, dependent on the distance to the bend, only. Of course, the weighting factor can take into account further vehicle parameters or environmental parameters, as discussed above.

That means, for example, if a vehicle is travelling with 80 km/h and approaches in 500 m a bend with a defined target speed of 40 km/h at the bend, a warning is not necessary, even if the difference between measured actual speed and target speed is high, as the distance'to the bend is very long. But in case the bend is only e.g. 150 m ahead, a warning would be shown. In case the distance to the bend is 500 m, the weighting factor might be set to "0", so that calculating a very simple weighting function by multiplying the weighting factor with the difference would give "0" as result meaning no warning is necessary. But if the distance to the curve has reduced e.g. to 150 m, the weighting factor can be set to another value different from "0", so that the result of the weighting function gives a certain amount which can be color coded. Dependent on the reduced distance, the weighting factor can be increased given higher and higher amounts which result in more visible colourations of the speedometer. In case the driver reduces its speed also the difference between the measured actual speed and the target speed reduces, which in turn also reduces the result of the weighting function leading to a less visible colouration. But in case the deceleration is not sufficient the weighting factor can be set to a very high value resulting in the same or yet in a more visible colouration.

2. The other approach also starts with the ADAS system determining a target speed, but then the ADAS system or a calculation unit, calculates optimal speed values for each distance to the bend. With other words, an optimal deceleration curve is determined for the vehicle. This optimal deceleration curve can be achieved e.g. by interpolation or extrapolation between/from an initially measured speed and/to the determined target speed. The optimal deceleration curve defines for each distance to the bend an optimal speed, wherein the optimal speed can also be weighted by additional vehicle parameters such as payload, braking power etc. and/or environmental parameters such as road conditions, weather conditions etc.

Then, the difference between the measured actual speed and the corresponding optimal speed is calculated and the result is color coded communicated to the driver.

As explained above, the information is only visible to the driver if the deceleration behaviour of the driver deviates from the optimal deceleration function.

The invention is not limited to the bend speed warning. It is also possible to inform the driver on other requirements for adjusting the speed e.g. in order to travel along with a green wave, which in turn can reduce fuel consumption, or approaching a preceding vehicle, or approaching a junction where a stop and subsequent turn to a different road is necessary. Thus, speed adjustment comprises not only a decelerating process but can also mean an acceleration. Additionally, a speed adjustment can be necessary if the weather conditions, road conditions, and/or road characteristics are changing or simply if a speed limit is set. That means that the invention can be implemented in all such cases where a speed adjustment should be communicated to the driver.

Moreover the invention can also be used in all other cases where a determined driving behaviour of a driver is required. For example, if the driver is operating the vehicle engine with RPM values above or below a recommended predetermined revolution -range, the invention can be used to guide the driver to the recommended operating behaviour.

On the other hand the invention is also usable for other vehicle parameters, particularly for parameters which are suited to be communicated by means of a gauge or meter, such as tire/oil/breaking-fluid pressure and/or for all parameters a communication of guidance is required.

FIGS. 1A-1D show a speedometer 2 comprising a speedometer needle 4 and a speedometer dial 6. The speedometer 2 can be an individual solid instrument but it is also possible that the speedometer is only displayed on a monitor, wherein the monitor can display a certain selection of instruments in the vehicle or all instruments in the vehicle and thereby forms a vehicle's dashboard. But the monitor can also display the speedometer only, and can even have the same shape as a traditional analogue speedometer. In contrast to the speedometer shown in FIG. 1, the speedometer can also have all known other shapes. It is even possible that the speedometer does not comprise a speedometer needle and a dial at all, but communicates the speed by digits only.

The speedometer 2 is at least partially coloured and/or illuminated by any suitable means, as for example an additional coloured dial which is mounted in front of the speedometer dial 6 or by means of illumination devices such as LEDs. It is also possible to use a speedometer with background illumination of the dial 6 and make the speedometer dial transparent in the desired region, e.g. by shading the other region by the help of a non-transparent additional dial. In case the speedometer is displayed it is also possible to adjust the color hue and/or color brightness and/or the color saturation in the corresponding regions by an appropriate control of the monitor. The coloured/illuminated region of the speedometer is referenced by reference number 8.

Figure 1B:
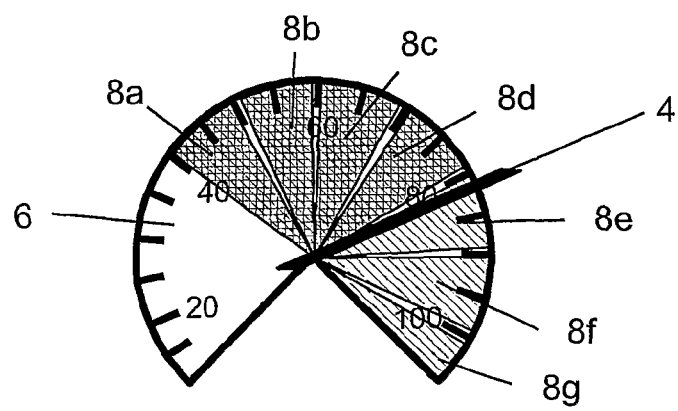
Figure 1C:
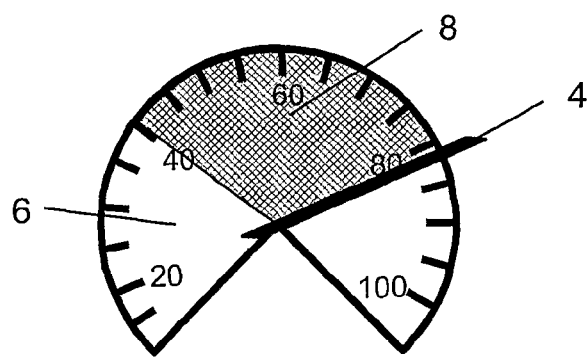

According to the invention, size, color brightness, color hue and color saturation of the coloured region 8 depend on a weighted amount of a deviation of a measured actual-speed-value-frøm-a predetermined speed value. The measured actual speed value in FIG. 1A-1C is exemplarily given by roughly 80 km/h and in FIG. 1D by 35 km/h. In the illustrated embodiments a target speed value is 40 km/h. Consequently, the driving behaviour recommendation communicated to the driver is a deceleration in the cases of FIGS. 1A to 1C but is an acceleration in case of FIG. 1D. Acceleration can be desired if e.g. the vehicle should travel along the road with a green wave, i.e. without being forced to stop due to red traffic lights located along the road the vehicle is supposed to travel.

In FIG. 1A a region 8 of the dial 6 of the speedometer 2 is continuously illuminated/coloured, whereby the region 8 corresponds to that region at the dial 6 which exceeds the target speed value 40 km/h. But it is also possible that only a part of the region 8 is illuminated/coloured, e.g. in form of a ring illuminating/colouring the dial numbers only which are located in that region 8.

FIG. 1B shows another embodiment of a coloured/illuminated speedometer, wherein the speedometer is illuminated/coloured in segments 8a-8g. The segments 8e-8g exceeding the measured actual speed value 80 km/h are illuminated/coloured with a different color hue, or a different brightness or color saturation than the segments 8a-8d between the target speed value 40 km/h and the measured actual speed value 80 km/h.

But it is also possible that only that region 8 between the measured actual speed value 80 km/h and the target speed value 40 km/h is illuminated/coloured as illustrated in FIG. 1C.

Figure 1D:
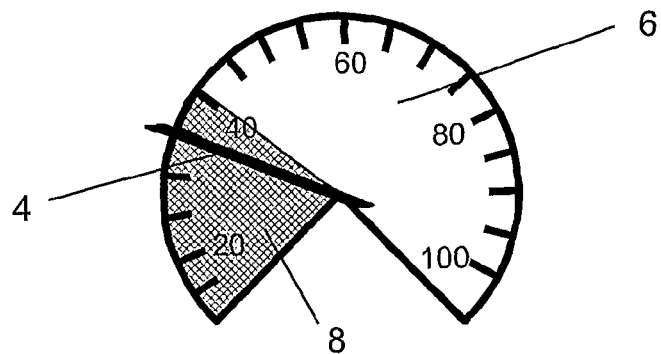

In FIG. 1D a region 8 of the dial of the speedometer 2 is illuminated/coloured, whereby the region 8 corresponds to that region at the dial 6 which is below the target speed value 40 km/h. In this scenario the measured actual speed of the vehicle is ca. 35 km/h which means it is below the target speed value 40 km/h. In such a case the region 8 of the speedometer is illuminated/coloured covering speed values from 0 km/h to the target speed value of 40 km/h. The region 8 can be illuminated in a way similar the situation described in connection with FIG. 1A-1C where the measured actual speed value exceeds the determined optimal speed value or the target speed value. But it is also possible that color hue, color brightness and/or color saturation are different for both situations (exceeding/being below the target/optimal speed value). For example it is possible that the illumination in case the measured actual speed value exceeds the target speed value is in red, but in case the measured actual speed value is below the target/optimal speed value the illumination is in green.

Communicating the fact that the measured actual speed is below the target speed is particularly preferred in case the driver wants to travel along a green wave or wants to travel a highway with a determined speed. Since it is not always desired to show the information that the measured actual speed value is below the target speed—for example in case the driver wants to drive slower through a bend as it is suggested by the system (e.g. due to an individual feeling for driving safely) or wants to stop before the bend—it is possible to adapt the method so that a deviation is only shown in case the target speed/optimal speed is exceeded. But it is also possible that the driver himself can decide from case to case that the information that his actual measured speed is below the target/optimal speed is shown. This can be achieved for example by providing an activation/deactivation element e.g. a button which can be pressed by the driver.

The general idea behind the embodiments depicted in FIG. 1A-1D is to detect any deviation of the measured actual speed of the vehicle from the determined optimal speed or the target speed (i.e. deviations with positive or negative values) and to encourage the driver to drive the vehicle in accordance with the determined optimal speed or the target speed by visualizing such deviations in the way described above.

All illustrated embodiments of colouration/illumination can be combined with each other so that for example, the colouration/illumination of the speedometer shown in FIG. 1A can also be a segmented.

Figure 2A:
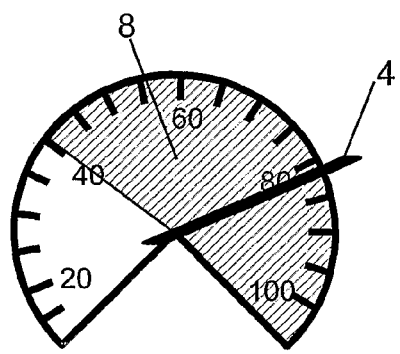
FIGS. 2A-2C: a simulation of a preferred embodiment of the inventive method.
Figure 2A:
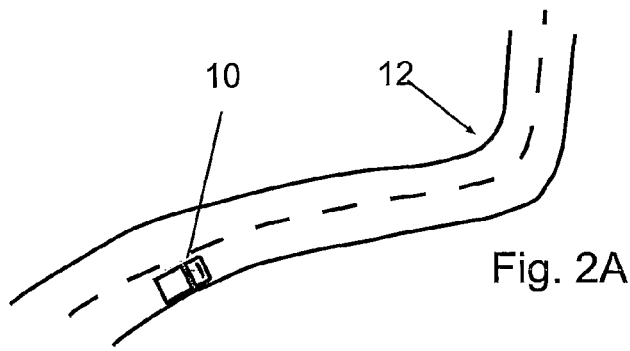
Figure 2B:
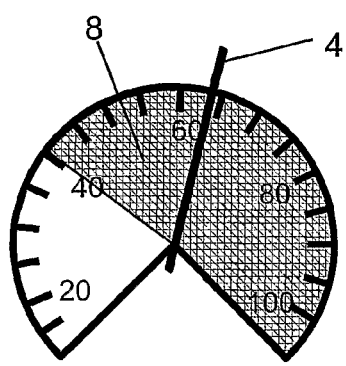
Figure 2B:
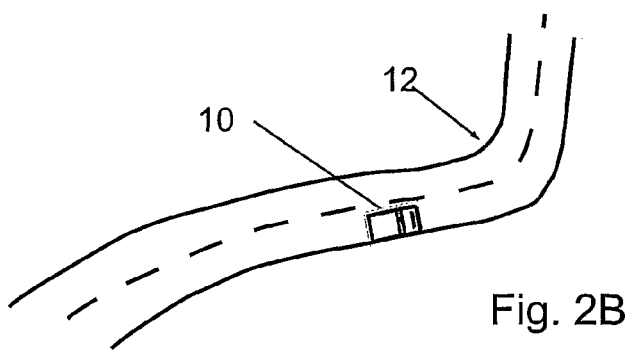
Figure 2C:
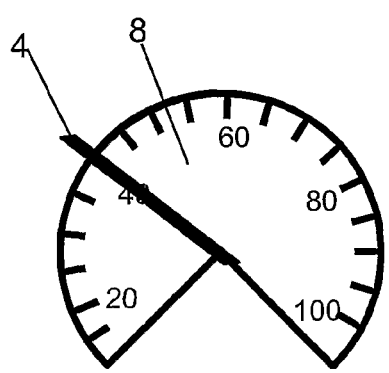
Figure 2C:
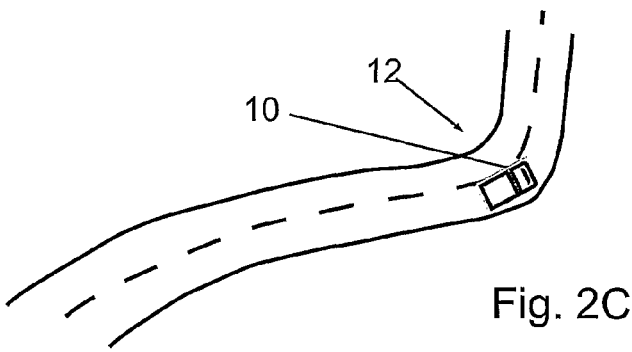

FIGS. 2A-2C show a situation in which the driver does not reduce the speed of the vehicle in accordance with the decreasing distance to bend ahead. In this illustrated example, the color brightness increases since the driver does not reduce the speed of the vehicle correspondingly.

FIG. 2A shows a vehicle 10 approaching a bend 12 with a speed of 80 km/h. A driver assistance system defines the target speed value for the vehicle at the bend to 40 km/h. A calculation unit (not shown) in the vehicle 10 or the driver assistance system itself calculates a weighting function with which the difference between the measured actual speed value (80 km/h) and the target speed value (40 km/h) is weighted by a weighting factor, for example the distance d of the vehicle 10 to the bend 12. The distance d to the bend can be determined for example by GPS.

As explained above and with reference to FIG. 2A, at a distance d1 to the bend 12, the calculation of the weighting function or the deviation of the measured actual speed to the optimal speed gives that the driver should decelerate the vehicle 10 in order to be able to drive safely through the bend 12 ahead. Correspondingly, a control unit (not shown) controls the colouration/illumination of the speedometer 2 so that that region 8 is coloured/illuminated which exceeds the predetermined speed value of 40 km/h.

In the illustrated example, with reference to FIG. 2B, the driver has reduced the speed of the vehicle 10 from 80 km/h to 65 km/h while driving the vehicle 10 from the first point on the road at a distance d1 to the bend 12 ahead to a second point on the road at a (shorter) distance d2 to the bend 12 ahead, i.e. by for example releasing the accelerator. However a continuously ongoing re-calculation of the weighting function or of the difference between the measured actual speed and the optimal speed gives at the second point of the road at distance d2 to the bend 12 ahead that the current deceleration rate is not sufficient to be able to drive safely through bend 12. Therefore, the brightness of the illuminated speedometer region 8 is increased accordingly although the driver had reduced the measured actual speed of the vehicle from 80km/h to 65 km/h.

Due to the increasing or increased brightness of the region 8 of the dial 6 of the speedometer 2 in the situation as depicted in FIG. 2B the driver can now realize that a further action, as for example operating a brake, is necessary to reach the recommended target speed at the bend 12 ahead.

As seen in FIG. 2C, the driver eventually has reduced the measured actual speed of the vehicle 10 to the target speed value at the bend of 40 km/h with the deceleration process guided by the fading in/fading out of the illuminated region 8 of the speedometer and therefore drives safely through the bend 12.

FIGS. 3A to 3F shows different scenarios of how the calculation of the weighting function or the difference to an optimal deceleration curve influences the color coded result communicated to the driver.

Depending on the result of the calculation of the weighting function or the difference between the measured actual speed and the optimal speed, the brightness and/or the saturation and/or the hue of the colour(s) are adapted. That means for example in case the driver travels with a very high speed but is still far away from the bend ahead and drives a vehicle without payload, the color is less bright than in the same case with the vehicle having a payload or driving in snow.

FIGS. 3A to 3F show a vehicle 10 approaching a curve 12, and a speedometer 2 with a speedometer needle 4 and a colorable region 8, wherein the colorable region 8 is coloured according to the color coded deviation amount. The target speed for the bend ahead is, as before, 40 km/h.

In FIG. 3A, the distance d1 of the vehicle 10 to bend 12 is long. Even if the difference between the measured actual speed (85 km/h) and the target value of 40 km/h is quite large, the weighting factor is still low (because of the long distance). Consequently, the colouration of region 8 is almost not visible.

With reference to FIG. 3B, although the driver has reduced its speed from 85 km/h to 65 km/h, the colouration of region 8 is more visible than in FIG. 3A, as the relatively short distance d2 to bend 12 and the insufficient deceleration increases the weighting factor.

FIG. 3C shows the same situation as FIG. 3B, but wherein the driver has not reduced his speed at all. The short remaining distance d2 to the bend 12 and the very high deviation of the measured actual speed of the vehicle from the optimal speed value or target speed value result in a clearly visible colouration of region 8.

FIGS. 3D and 3E show the same situation as FIGS. 3A and 3B in bad weather condition (for instance snow). The same distance d1 to bend 12 and the same speed of 85 km/h results in a clearly visible colouration of region 8, because the weighting factor is set to a higher value due to the bad weather condition. Accordingly, the deceleration to 65 km/h as shown in FIG. 3E is not sufficient for the distance d2 and result in a strongly coloured region 8.

Even a deceleration to almost 40 km/h, as shown in FIG. 3F, still results in a visible colouration due-to the increased weighting factor because of the bad weather condition.

Provided that the driver drives reasonable and is willing to follow a guidance, the inventive method can communicate a recommended driving behaviour without direct interaction with the driver. Therefore, it is possible to communicate even highly important parameters without warning a driver directly.

The invention is not restricted to applications in vehicles as described above but can also be used in applications for ships, air planes, construction-site machines, motorbikes, etc.

The invention claimed is:

1. A method for communicating in a vehicle at least one deviation of an measured actual vehicle parameter value from its predetermined value to a driver comprising the steps of:
   determining an amount of the deviation by calculating a difference between the measured actual vehicle parameter value and the predetermined vehicle parameter value and weighting the calculated difference between the measured actual vehicle parameter value and the predetermined vehicle parameter value with a first weighting factor;
   calculating the first weighting factor as a function of proximity to at least one of an additional vehicle parameter and an environmental parameter;
   color-coding the amount of deviation; and
   communicating the amount of deviation to the driver by using the color code only when the amount of deviation is beyond a predetermined magnitude.

2. The method according to claim 1, wherein the predetermined vehicle value is weighted by a second weighting factor.

3. The method according to claim 1, wherein the predetermined vehicle value is a target value the measured actual vehicle parameter should have of at least one of a predetermined target time and at a predetermined target location.

4. The method according to claim 1, wherein the predetermined value is a calculated optimal value that the measured actual vehicle parameter should have at least one of (a) at the time and (b) at the location of the actual measurement, wherein the calculated optimal value is determined by a nominal function dependent on at least one of (1) time,(2) location and (3) a second weighting factor.

5. The method according to claim 1, wherein the weighting with the first and/or second weighting factor comprises the calculation of at least one of a linear and non-linear weighting function.

6. The method according to claim 1, wherein at least one of the first and second weighting factor(s) and the amount of deviation and the predetermined value are/is continuously or recurrently re-determined or recalculated, wherein at least one of the first and the second weighting factor is at least one of (i) at least one vehicle parameter, particularly a total vehicle weight, a vehicle's payload, or a vehicle's braking power, and (ii) at least one environmental parameter, particularly a road condition, a road characteristic, a weather parameter, a car-to-car distance, or a distance to an obstacle.

7. The method according to claim 1, wherein the predetermined value is determined by another vehicle-related-system.

8. The method according to claim 1, wherein the amount of deviation is color-coded by gradually changing at least one of a brightness or hue of at least one color, in particular by increasing at least one of the brightness and hue of the color in case the amount of deviation increases and by decreasing at least one of the brightness and hue of the color in case the amount of deviation decreases and by keeping at least one of the brightness and hue constant in case the amount of deviation is constant, wherein the amount of deviation is color-coded by gradually changing a color hue, in particular by changing the color hue in a range (i) from green over yellow to red or, alternatively, from yellow to red in case the amount of deviation increases and (ii) from red over yellow to green or, alternatively, from yellow to green in case the amount of deviation decreases.

9. The method according to claim 1, wherein at least one of the color brightness, saturation and hue is different for the case that the measured actual vehicle parameter exceeds the predetermined vehicle parameter value and for the case that the measured actual vehicle parameter is below the predetermined vehicle parameter value and wherein the at least one of the color brightness, saturation and hue can also be adapted according to ambient light conditions.

10. The method according to claim 1, wherein the vehicle parameter is a parameter which is communicated to a driver by means of a gauge/meter, which can be displayed on a monitor for at least one of speed, RPM and fuel consumption, wherein the gauge/meter is at least one of at least partially colorable and illuminable and the color-code is implemented in the coloration/illuminated of the gauge/meter and wherein that part of the gauge/meter is colored/illuminated which corresponds to it region of the gauge/meter that exceeds the predetermined, value or is below the predetermined value.

11. The method according to claim 10, wherein the method is performed by a control unit, particularly a CPU, wherein the control unit also controls the coloration/illumination of the gauge/meter and the display of the monitor.

12. A device in a vehicle for communicating a deviation of a measured actual vehicle parameter value from a predetermined value, wherein the device comprises a colorable unit which is arranged to communicate an amount of deviation by color-code only when the amount of deviation is beyond a predetermined magnitude, and wherein the amount of deviation is a result of a weighting function weighting a calculated difference between the measured actual vehicle parameter value and the predetermined vehicle parameter value with a first weighting factor, the first weighting factor being calculated as a function of proximity to at least one of an additional vehicle parameter and an environmental parameter.

13. The device according to claim 12, comprising means adapted to perform a method for communicating in a vehicle at least one deviation of an measured actual vehicle parameter value from its predetermined value to a driver comprising the steps of determining an amount of the deviation by calculating a difference between the measured actual vehicle parameter value and the predetermined vehicle parameter value and weighting the calculated difference between the measured actual vehicle parameter value and the predetermined vehicle parameter value with a first weighting factor, color-coding the amount of deviation, and communicating the amount of deviation to the driver by using the color code, wherein the device is partially colorable and is at least partially illuminable and the color-code is implemented in the illumination of the device.

14. The device according to claim 12, further comprising an activation element for activating/deactivating the communication of either the fact that the measured actual vehicle parameter is below the predetermined vehicle parameter value or of the fact that the measured actual vehicle parameter exceeds the predetermined vehicle parameter value and further comprising an optical sensor is provided to sense the ambient light condition so that the color brightness, saturation and hue of the device is also adaptable to ambient light conditions, particularly daytime, night-time or driving in a tunnel, manually and automatically.

15. The device according to claim 12, wherein the device is a gauge/meter, particularly for speed, RPM and fuel consumption, wherein the device is an analogue gauge/meter and that part of the gauge is illuminated which exceeds/succeeds the predetermined value and wherein the device is a monitor.

16. A driver information system in a vehicle for communicating a deviation of a measured actual vehicle parameter value from its predetermined value to a driver comprising a calculation unit for determining the amount of deviation and a device according to claim 12 which is adaptable to communicate the amount of deviation by color-code wherein the amount of deviation is the result of a weighting function weighting a calculated difference between the measured actual vehicle parameter value and the predetermined vehicle parameter value with a first weighting factor.

17. The system according to claim 16, wherein a method for communicating in a vehicle at least one deviation of an measured actual vehicle parameter value from its predetermined value to a driver comprising the steps of determining an amount of the deviation by calculating a difference between the measured actual vehicle parameter value and the predetermined vehicle parameter value and weighting the calculated difference between the measured actual vehicle parameter value and the predetermined vehicle parameter value with a first weighting factor, color-coding the amount of deviation, and communicating the amount of deviation to the driver by using the color code is used.

18. A vehicle, particularly a truck, comprising a system according to claim 16.

19. A computer programmed to perform a method according to claim 1.

* * * * *